April 16, 1940.
J. C. PRICKETT
2,197,316
HARROW
Filed Aug. 8, 1939
3 Sheets-Sheet 1
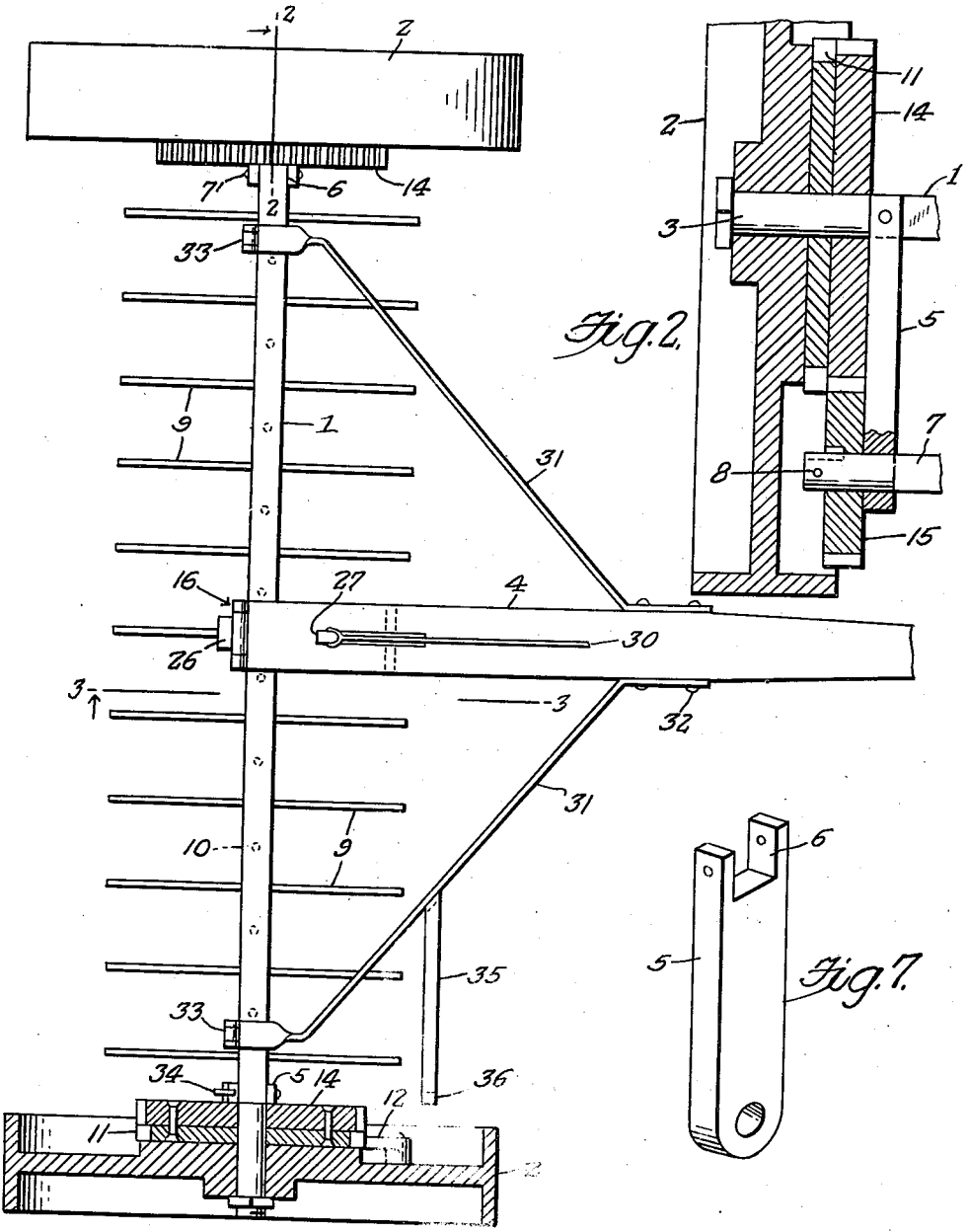
Inventor
John C. Prickett,
By Clarence A. O'Brien
and Hyman Berman
Attorneys April 16, 1940.  J. C. PRICKETT  2,197,316
HARROW
Filed Aug. 8, 1939  3 Sheets-Sheet 2

Inventor
John C. Prickett,

By Clarence A. O'Brien
and Hyman Berman
Attorneys

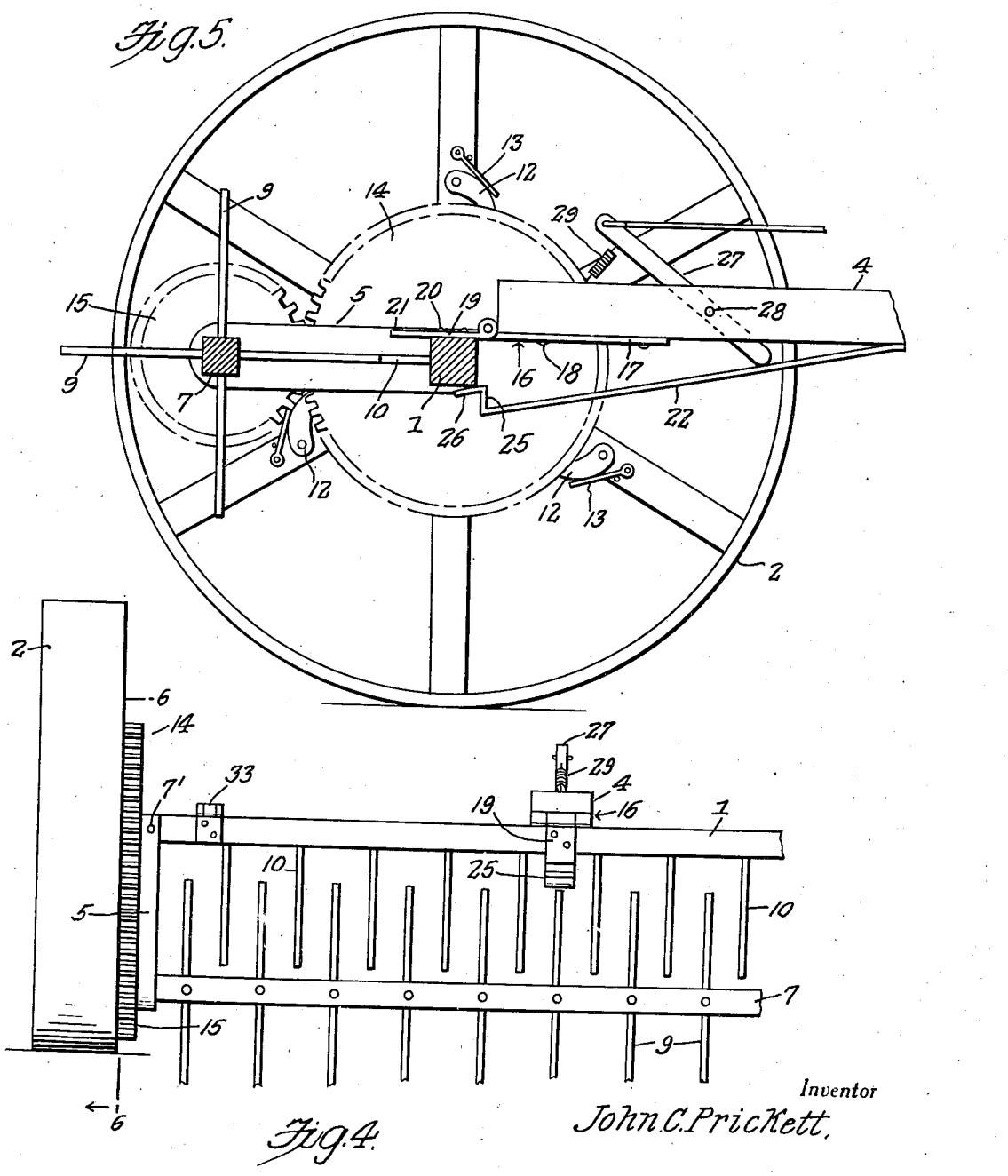

Patented Apr. 16, 1940

2,197,316

UNITED STATES PATENT OFFICE 2,197,316

HARROW

John Corniellus Prickett, Anacortes, Wash.

Application August 8, 1939, Serial No. 289,024

3 Claims. (Cl. 97—40)

My invention relates to improvements in harrows of the rotary type and the primary purpose in view is to provide a simply constructed, easily operated ground-working implement of this character equipped to break up and pulverize plowed ground in a shorter space of time than harrows as commonly constructed.

The invention also comprehends other, and subordinate objects, all of which together with the precise nature of my improvements will be readily understood when the succeeding description and claims are read with reference to the drawings accompanying and forming part of the specification.

In said drawings—

Figure 1 is a view in top plan, partly in section, of a harrow constructed in accordance with my invention, Figure 2 is a fragmentary view in vertical transverse section taken on the line 2—2 of Figure 1 and drawn to an enlarged scale, Figure 3 is a view in transverse section taken on the line 3—3 of Figure 1 and showing the swingable part in forward normal position, Figure 4 is a fragmentary view in rear elevation, Figure 5 is a view similar to Figure 3 but showing the swingable part in rearmost position, Figure 6 is a fragmentary view in elevation of one of the ratchet wheels and the ratchet pawls associated therewith, Figure 7 is a view in perspective of one of the arms, Figure 8 is a fragmentary view in top plan illustrating in detail the latching means, and Figure 9 is a detail view in section taken on the line 9—9 of Figure 8.

Referring to the drawings by numerals, in the preferred embodiment illustrated, the harrow of my invention comprises as its basic equipment an axle bar 1, preferably square and of any suitable material, a pair of suitable ground wheels 2 freely rotatable upon spindles, as at 3, at opposite ends of said axle bar, and a draft tongue 4 attached to the axle bar 1 in a manner presently described.

The axle bar 1 supports, between the ground wheels 2, a pair of parallel arms 5 fixedly mounted at inner ends thereof on said bar to extend at right angles therefrom, in the same direction, adjacent opposite ends of the bar and the inner sides of the ground wheels, respectively. Preferably said arms 5 are fixed to the axle bar 1 by providing the same with a bifurcated end 6, respectively, fitting over the axle bar 1, and bolts 7' extended through said ends 6 and said bar. Journaled at its opposite ends in the outer ends of the arms 5 is a rotatable toothed harrow shaft 7, the ends of the shaft extending beyond the outer sides of the arms, as at 8, for a purpose presently seen. The shaft 7 is provided with a plurality of tine-like radial harrow teeth 9 arranged in laterally spaced groups on said shaft and adapted to enter the ground. The axle bar 1 is provided with a plurality of similar teeth 10 spaced along the same and extending therefrom parallel with the arms 5 and interspersed with the groups of teeth 9 respectively.

The harrow shaft 7 is adapted to be rotated, under forward rotation of the ground wheels 2, in a relatively reverse direction as compared with the direction of rotation of said ground wheels, and by means of the following drive gearing. A pair of ratchet wheels 11 are rotatably mounted on the spindles 3 of the axle bar 1 between the wheels 2 and the arms 5. Ratchet pawls 12 pivoted on said wheels 2, respectively, and urged by leaf springs, as at 13, into engagement with the ratchet wheels 11, provide for rotation of said wheels 11 under forward rotation of said ground wheels, said pawls 12 ratcheting over said wheels 11 under reverse rotation of the ground wheels 2 for a purpose which will be understood. A pair of driven gears 14 are fixed to the ratchet wheels 11 concentrically thereof. The gears 14 mesh constantly with a pair of smaller driven gears 15 fast on the extended ends 8 of the harrow shaft 7 respectively.

Returning now to the axle bar 1, and the tongue 4, said bar 1 is connected to the rear end of said tongue 4 to swing forwardly and rearwardly thereon about an axis parallel with the axis of the bar. The connection takes the form of a hinge 16 having a leaf 17 bolted, as at 18, to the underside of said tongue 4, and a leaf 19 similarly secured, as at 20, to one face of said bar 1 and extending, as at 21, beyond the bar, the arrangement being such that said bar 1 is swingable into a forward normal position beneath the leaf 17 flat against the same, as shown in Figures 1 and 3, or, rearwardly, through substantially a 90° arc of movement, into a rearmost position in which it trails the tongue 4 as shown in Figure 5. As will be seen, as a result of such swinging of the axle bar 1, the ground wheels 2, arms 5, the described drive gearing 14, 15 and teeth 9 and 10 are swung on the tongue 4 about the axis of swinging movement of said bar 1 from a forward into a rearmost position, and vice versa. As best shown in Figure 3, the arms 5 are arranged on the axle bar 1 so that in the forward position of said axle bar, and the remaining swingable parts, said arms depend vertically from said axle bar 1 and adjust the teeth 9 into a position such that they are rotatable into and out of the ground. On the other hand, in the rearmost position of said axle bar 1, said arms 5 are swung into a rearwardly extending horizontal position in which the teeth 9, likewise the teeth 10, are elevated above and out of the ground.

A releasable latch mechanism is provided for latching the axle bar 1 in forward position. The latch mechanism comprises a leaf spring 22 having a front end 23 bolted, as at 24, to the underside of the tongue 4, and a rear hooked end 25 adapted to swing upwardly behind the extension 21 of leaf 19, in the forward position of said bar. The hooked end 25 is provided with an arcuate camming end 26 adapted in the rearmost position of said axle bar 1 to bear upwardly against the same and whereby said bar 1 in its movement to forward position cams said hooked end 26 downwardly to condition the same to snap behind said bar 1 into latching position shown in Fig. 3. A latch release lever 27 is pivoted, as at 28, on said tongue 4 to be swung in one direction against the spring 22 and depress the same into unlatching position. A suitably connected coil spring 29 tensions said lever against movement in said direction. A lever-operating rod 30 is provided for swinging the lever 27 from the front of the harrow.

The tongue 4 and axle bar 1 may be braced by means of a pair of brace rods 31 bolted to the tongue 4, as at 32, and diverging rearwardly to the axle bar 4 upon opposite sides of the tongue, respectively, the axle bar 1 being hingedly connected, as at 33, to said bars 31, respectively, in the same manner as described with reference to the connection of the axle bar 1 to the tongue 4.

In addition to the foregoing, means are provided for releasably latching the arms 5, and hence the shaft 7, teeth 9 and teeth 10 in rearmost position. This latching means comprises a resilient bar-like finger 34 extending from one arm 5 vertically, in the forward position of the latter, and adapted under swinging of said axle bar 1, and arms 5, into rearmost position, to wipe forwardly and downwardly past the outer end of a resilient detent bar 35 extending laterally from one of the brace bars 31, said detent bar being suitably secured at its inner end to said brace bar 31 and having a cam-like outer end 36 facilitating wiping of the finger 34 past the same. The finger 34 and detent bar 35 are formed of flexible metal so as to be swung apart manually for unlatching of said means.

As will now be apparent in the forward position of the axle bar 1 and the other swingable parts, the teeth 9 are rotated into and out of the ground under forward travel of the harrow in a direction reverse to that of rotation of the ground wheels 2, that is to say, counterclockwise, so that the ground is worked with forward strokes by the teeth 9 and thereby thoroughly broken up and pulverized. The teeth 10 function, out of the ground, to break up clods thrown rearwardly by the teeth 9. When it is desired to disable the harrow, or, to render the same idle, the axle bar 1 may be unlatched, in the manner already described, for rearward swinging movement of the swingable parts from forward position. When said axle bar 1 is so unlatched forward pull of the harrow for a short distance, and the drag of the described swingable parts will result in the axle bar 1 and ground wheels 2, together with the ratchet wheels 11 and driven gears 14 being swung into their rearmost position. Under such swinging of the axle bar 1, the arms 5 will be swung to their rearmost position lifting the shaft 7 and the teeth 9 out of the ground and into rearmost position above the same, the driven gears 15, shaft 7 and teeth 9 idling in a planetary manner around the driving gears 14. At this point, the swingable parts will be latched in rearmost position by the described latching means 34, 35, 36 for unlatching at will in the manner already described. Upon such unlatching of the swingable parts, from their rearmost position, and under slight backing of the harrow, the parts will, under gravitational action of the arms 6, shaft 7, and teeth 9, 10, be swung into forward position in a manner which will now be clear, the axle bar 1 camming the spring 22 down for snap action latching behind the same as described in the foregoing.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claims.

What I claim is:

1. In a harrow of the class described, a draft rigging, a wheel-supported axle pivotally connected to said rigging for lateral swinging adjustment bodily thereon into forward and rearward limits of movement, respectively, a rotary ground-working unit mounted on said axle and swingable thereby into and from ground-engaging position under adjustment of said axle into its forward and rearward limits of movement, respectively, a planetary gear drive between one of said wheels and said rotary unit, and latch mechanism for releasably holding said axle in said limits of movement thereof, said ground-working unit comprising a rotary shaft operative by said drive reversely relative to the direction of rotation of said one wheel, and tine-like ground working teeth extending radially from said shaft and arranged thereon in longitudinally spaced series.

2. In a harrow of the class described, a draft rigging, a wheel-supported axle pivotally connected to said rigging for lateral swinging adjustment bodily thereon into forward and rearward limits of movement, respectively, a rotary ground-working unit mounted on said axle and swingable thereby into and from ground-engaging position under adjustment of said axle into its forward and rearward limits of movement, respectively, a planetary gear drive between one of said wheels and said rotary unit, and latch mechanism for releasably holding said axle in said limits of movement thereof, said ground-working unit comprising a rotary shaft operative by said drive reversely relative to the direction of rotation of said one wheel, and tine-like ground working teeth extending radially from said shaft and arranged thereon in longitudinally spaced series, said axle being provided with similar teeth extending therefrom and interspersed with the series of first-mentioned teeth respectively.

3. In a harrow of the class described, a draft rigging, a wheel-supported axle pivotally connected to said rigging for lateral swinging adjustment bodily thereon into forward and rearward limits of movement, respectively, a rotary ground-working unit mounted on said axle and swingable thereby into and from ground-engaging position under adjustment of said axle into its forward and rearward limits of movement, respectively, a planetary gear drive between one of said wheels and said rotary unit, and latch mechanism for releasably holding said axle in said limits of movement thereof, said drive including a pawl and ratchet connection to said one wheel.

JOHN CORNIELLUS PRICKETT.